United States Patent Office 3,545,928
Patented Dec. 8, 1970

3,545,928
INHIBITOR DETECTION COMPOSITION
James L. Dunn, Jr., and James C. Renfro, Lake Jackson, Tex., assignors to The Dow Chemical Company, Midland, Mich., a corporation of Delaware
No Drawing. Filed Dec. 28, 1967, Ser. No. 694,055
Int. Cl. C09k 3/00; G01n 31/22
U.S. Cl. 23—230      4 Claims

ABSTRACT OF THE DISCLOSURE

An indicator composition comprising methyl orange, xylene cyanol and hydrobromic acid useful to detect, by color indication, the concentration of acid-acceptor type inhibitors in chlorinated solvents.

---

This invention relates to a method and composition for the detection of certain stabilizers in chlorinated solvents, and more particularly relates to a method and composition for the testing of stabilized chlorinated solvents containing an acid acceptor type inhibitor to determine whether or not such an inhibitor is present in the desired stabilizing quantities.

As is well known in the art, most chlorinated solvents such as methylene chloride, perchloroethylene, trichlorethylene, 1,1,1-trichloroethane and 1,1,2-trichloroethane require the presence of an inhibitor before such solvents are industrially useful for purposes such as liquid and vapor degreasing. Inhibitors of the acid-acceptor type such as butylene oxide, epichlorohydrin, N-methyl pyrrole, diisopropylamine and tri-N-butylamine are normally employed and must be maintained at a definite level in order to provide the required degree of stabilization. As the solvent is used, the inhibitor concentration normally decreases and must be periodically replenished. However, methods of analysis to determine the concentration of such inhibitors have heretofore been difficult, time consuming, and no simple tests have been designed which would enable one to quickly determine the inhibitor concentration in a chlorinated solvent.

It is an object of this invention to provide a method whereby the concentration of an acid-acceptor type inhibitor in a chlorinated hydrocarbon can be quickly and easily determined. A further object is to provide an indicator composition which by color indication will define the inhibitor concentration in the chlorinated solvent. These and other objects and advantages of the present invention will become apparent from a reading of the following detailed description.

It has now been discovered that a composition consisting essentially of a solution of methyl orange, xylene cyanol and hydrobromic acid (HBr) when contacted with a chlorinated solvent containing an acid-acceptor type inhibitor will produce a color change from pink, indicating that no inhibitor is present, through lavender and purple to green indicating the presence of over 600 p.p.m. of such inhibitor. The indicator composition comprises a solution of methyl orange and xylene cyanol in weight proportions of from about 3:1 to about 1:3 containing sufficient HBr to produce a pink color. It is usually preferred to employ a water-soluble solvent such as glycerine and water, e.g. 5 to 20 wt. percent glycerine in water, containing from about 0.01 to about 0.03 wt. percent each of methyl orange and xylene cyanol and from about 0.5 to 3% by weight of HBr. When appropriate, greater or lesser concentrations of the indicator in the solvent may be employed, provided the proportions of the indicator components retain the relationship given i.e. from about 0.0033 to about 0.06 unit weights each of methyl orange and xylene cyanol for each unit weight of HBr.

A preferred embodiment of the present invention comprises the indicator composition contained upon or within a porous base or substrate such as paper, cloth, or the like such that the composite is contacted with the chlorinated solvent to be tested to produce a color change of the impregnated substrate. A preferred method for preparing a porous substrate indicator such as an indicator paper is to impregnate paper such as No. 1 Wattman filter paper with a solution of a mixture of methyl-orange and xylene cyanol in a weight ratio of about 1:1 in a mixture of glycerine and water containing from about 5 to about 20% glycerine and additionally containing from 0.5 to about 3 wt. percent of HBr which may be admixed therewith as an HBr solution in an acetic acid. After impregnation, the paper is dried and cut into strips of the desired size. The level of acid-acceptor type inhibitor contained in the chlorinated solvent is then rapidly and easily determined by contacting a proportion of such treated paper strip with the liquid or vapor phase of the chlorinated solvent to be tested and observing the color of the test strip. The following chart indicates the color achieved when the treated strip is contacted with the inhibitor containing chlorinated solvent:

| Color after 5 minutes exposure to vapor: | Concentration of inhibitor in vapor (p.p.m.) |
|---|---|
| Pink | 0 |
| Lavender | 150 |
| Purple | 200–600 |
| Green | 600–above |

Some slight variation in sensitivity is encountered depending upon the particular chlorinated solvent tested and upon the nature of the acid-acceptor type inhibitor employed therein.

As used herein, the expression, "acid-acceptor type inhibitor" means: a chemical compound useful as a stabilizer in chlorinated solvents and which contains a functional group or groups that will react with any acid, but more especially with halogen containing acids, such as for example, HCl and HBr. Common acid-acceptor type inhibitors include butylene oxide, epichlorohydrin, N-methyl pyrrole, diisopropyl amine, tri-N-butylamine, and the like.

The deepness of the color of the indicator-containing substrate is determined to a large extent by the HBr concentration in the indicator composition i.e. higher concentrations of HBr in the composition produce a deeper pink color of the substrate whereas lower concentrations produce a lighter pink color which borders on violet at very low concentrations.

The following examples are provided to more fully illustrate the invention but are not to be construed as limiting to the scope thereof:

EXAMPLE 1

Strips of filter paper ½″ x 2″ were saturated with a solution containing 20 ml. of a solution containing 1.5 g./l. of methyl-orange and 1.4 g./l. of methyl cyanol, 10 ml. of glycerine, 70 ml. of water and 5 ml. of a 30 wt. percent solution of HBr in acetic acid. The saturated paper was then dried. Solutions of trichloroethylene and 1,1,1-trichloroethane were then prepared containing known proportions of inhibitor. Test strips were then contacted with the vapor or condensed clean solvent of such solutions at their boiling point and the results of such tests are recorded in the table below.

| Color of test strip | 1,1,1-trichloroethane | | Trichloroethylene | |
|---|---|---|---|---|
| | Actual inhibitor conc., p.p.m. | Inhibitor conc. as indicated by test strip, p.p.m. | Actual inhibitor conc., p.p.m. | Inhibitor conc. as indicated by test strip, p.p.m. |
| Pink | 0 | 0 | 0 | 0. |
| Lavender | 150 | 150 to 200 | 150 | 150 to 200. |
| Purple | 250 | 200 to 600 | 250 | 200 to 600. |
| Do | 300 | 200 to 600 | 300 | 200 to 600. |
| Do | 500 | 200 to 600 | 500 | 200 to 600. |
| Purple-green | 600 | 200 to 600 | 600 | 600 and over. |
| Green | 1,000 | 600 and over | 1,000 | 600 and over. |

Various modifications can be made in the present invention without departing from the spirit or scope thereof for it is understood that we limit ourselves only as defined in the appended claims.

We claim:

1. A process for determining the concentration level of acid-acceptor type inhibitors which comprises contacting with an acid-acceptor type inhibitor-containing chlorinated solvent a color responsive indicator consisting essentially of a solution of methyl orange and xylene cyanol in a weight ratio of from about 3:1 to about 1:3 combined with HBr in a weight ratio of from about 0.003 unit weight each of methyl orange and xylene cyanol per each unit weight of HBr and, observing color changes corresponding to known levels of concentration of said inhibitor.

2. The process of claim 1 wherein the color responsive indicator is impregnated onto a porous substrate.

3. The process of claim 2 wherein the porous substrate is paper.

4. An indicator composition useful to determine the concentration of acid-acceptor type inhibitors contained in a chlorinated solvent which comprises a mixture of methyl orange and xylene cyanol in a weight ratio of between about 3:1 and 1:3 combined with sufficient hydrobromic acid to impart a pink color thereto.

References Cited

UNITED STATES PATENTS 3,139,328   6/1964   Jacob _____ 23—253TP

OTHER REFERENCES

Hickman et al., Chem. Abstr. 17, 700 (1923).

MORRIS O. WOLK, Primary Examiner

R. M. REESE, Assistant Examiner

U.S. Cl. X.R.

23—25.3; 252—408